United States Patent [19]

Krieg

[11] Patent Number: 4,654,191

[45] Date of Patent: Mar. 31, 1987

[54] PRESSURE RELEASE ARRANGEMENT FOR THE SAFETY CONTAINMENT OF A PRESSURIZED WATER NUCLEAR REACTOR

[75] Inventor: Rolf Krieg, Karlsruhe, Fed. Rep. of Germany

[73] Assignee: Kernforschungszentrum Karlsruhe GmbH, Karlsruhe, Fed. Rep. of Germany

[21] Appl. No.: 724,976

[22] Filed: Apr. 19, 1985

[30] Foreign Application Priority Data

Jun. 9, 1984 [DE] Fed. Rep. of Germany ....... 3421654

[51] Int. Cl.⁴ .............................................. G21C 9/00
[52] U.S. Cl. ................... 376/283; 137/68.1; 137/797; 220/89 A
[58] Field of Search ................. 137/68.1, 70, 71, 797; 220/89 A; 376/283

[56] References Cited

U.S. PATENT DOCUMENTS

| | | | |
|---|---|---|---|
| 2,079,164 | 5/1937 | Glab | 220/89 A |
| 2,203,367 | 6/1940 | Schorer | 137/70 |
| 3,155,271 | 11/1964 | Summers et al. | 137/71 |
| 3,815,619 | 6/1974 | Ross et al. | 137/68.1 |
| 4,064,003 | 12/1977 | Newton | 137/68.1 |
| 4,402,334 | 9/1983 | Taylor | 137/71 |

Primary Examiner—Deborah L. Kyle
Assistant Examiner—Richard W. Wendtland

[57] ABSTRACT

A pressure release arrangement for a pressure container such as a safety containment of a nuclear reactor, wherein a pressure release pipe extends through the containment walls and is closed at its inner end and connected to a drawbar mounted with its other end to a distant point of the container wall. The release pipe has within the containment an area of reduced thickness providing for a design breaking point at which the pipe is caused to rupture when the container is stretched by overpressurization beyond a predetermined point thereby relieving the pressure.

With this arrangement, pressure is safely relieved before uncontrolled explosion of the containment but only when absolutely necessary.

6 Claims, 2 Drawing Figures

PRESSURE RELEASE ARRANGEMENT FOR THE SAFETY CONTAINMENT OF A PRESSURIZED WATER NUCLEAR REACTOR

BACKGROUND OF THE INVENTION

The present invention relates to a pressure release arrangement for a container, especially for the safety containment of a pressurized water nuclear reactor in connection with which it is utilized to provide for safe pressure release before the occurrence of a containment explosion.

Pressure reduction in containers may be achieved by operational measures which, during failures, always impart certain insecurities. It is generally safer to install in the safety containment a suitable pressure relief valve which is independent of operational actions.

It is the object of the present invention to provide a release valve which remains securely closed during normal operating pressures in the safety containment and which opens only just before rupture of the containment would otherwise occur since otherwise, that is, if the valve could open earlier, containment integrity during the normal, more likely accidents for which the containment was designed might be questionable.

It is also to be taken into consideration that testing of the valve for proper operation is not possible when such a valve is installed since the valve opening pressure is above the operating pressure for which the containment is designed. Such a valve therefore needs to be composed of simple structural elements which can be exactly calculated by well established stress analysis techniques.

SUMMARY OF THE INVENTION

In a pressure release arrangement for a pressure container such as the pressure containment of a nuclear reactor, a pressure release pipe extends through the containment walls and is closed at its end within the containment by a closure plate. A drawbar is with one end operatively connected to the closure plate and with its other end to a distant point of the containment walls. Within the containment, the release pipe has a design rupture wall area adapted to be ruptured by the drawbar when the vessel walls are stretched beyond a predetermined degree so as to release the pressure to prevent explosion of the containment but to release the pressure only when absolutely necessary as evidenced by stretching of the containment walls.

With this arrangement, pressure and, if contained in the containment, radioactive material are released to the environment safely and in a simple manner only when necessary to avoid a more serious accident as it would surely happen by explosion of the containment.

The advantages of a relief valve controlled by stress-induced deformation of materials are as follows:

During the plastic deformation of the safety containment, a substantial amount of mechanical energy is consumed. A portion of the energy can be utilized by means of the simple elements for the opening of the pressure relief valve. Auxiliary operating means are not necessary. As a result the pressure relief valve is a simple structure which is fully passively operative and insures high reliability without requiring servicing.

Growing plastic deformation of the safety containment is a reliable indication that a critical state of complete rupture of the containment is approaching.

In contrast, the containment pressure is a less reliable indicator since deformation occurs as a result of overpressurization and the interrelation between pressure and deformation is of complex nature with inherent inaccuracies so that the pressure at which a relief valve must be opened cannot exactly be determined. If the pressure would be used as a basis for the control of the pressure relief valves, it would be easily possible, for example, that the pressure relief valve would be permitted to open unnecessarily upon occurrence of momentary pressure peaks which, because of the mass inertia of the containment, would not generate critical deformation of the containment, resulting possibly in unnecessary release of radioactive material.

Plastic deformation passes a plurality of stages at a certain pressure before the rupture of a container occurs. Selection of the particular stage at which the valve is open is therefore not critical. On the other hand, the respective pressure has only a relatively small delay period before failure of the containment would occur because of the non-linearity of the stress-strain curve. Inaccuracies of the values controlling a pressure dependent relief valve would therefore be of great influence. As a result, pressure control of the relief valve would not be advantageous.

The relief valve according to the invention has no seals or gaskets which may cause leakage long before opening of the valve. There are essentially no movable components. Only the drawbar moves slightly in an opening in the operating beam until a given free motion length is accommodated. Furthermore, the valve opens only far enough to prevent a further rise in pressure in the safety containment. Undesired opening of the valve, if possible, is possible only by strong mechanical impacts. However, they can be avoided by suitable selection of the valve location or by providing protective panels.

SHORT DESCRIPTION OF THE DRAWINGS

FIG. 1 shows a pressure relief valve in a closed state with the containment walls unstressed; and FIG. 2 shows the same relief valve opened by a pressure containment wall stretch of about 2%.

DESCRIPTION OF THE PREFERRED EMBODIMENT

Figures 1, 2:
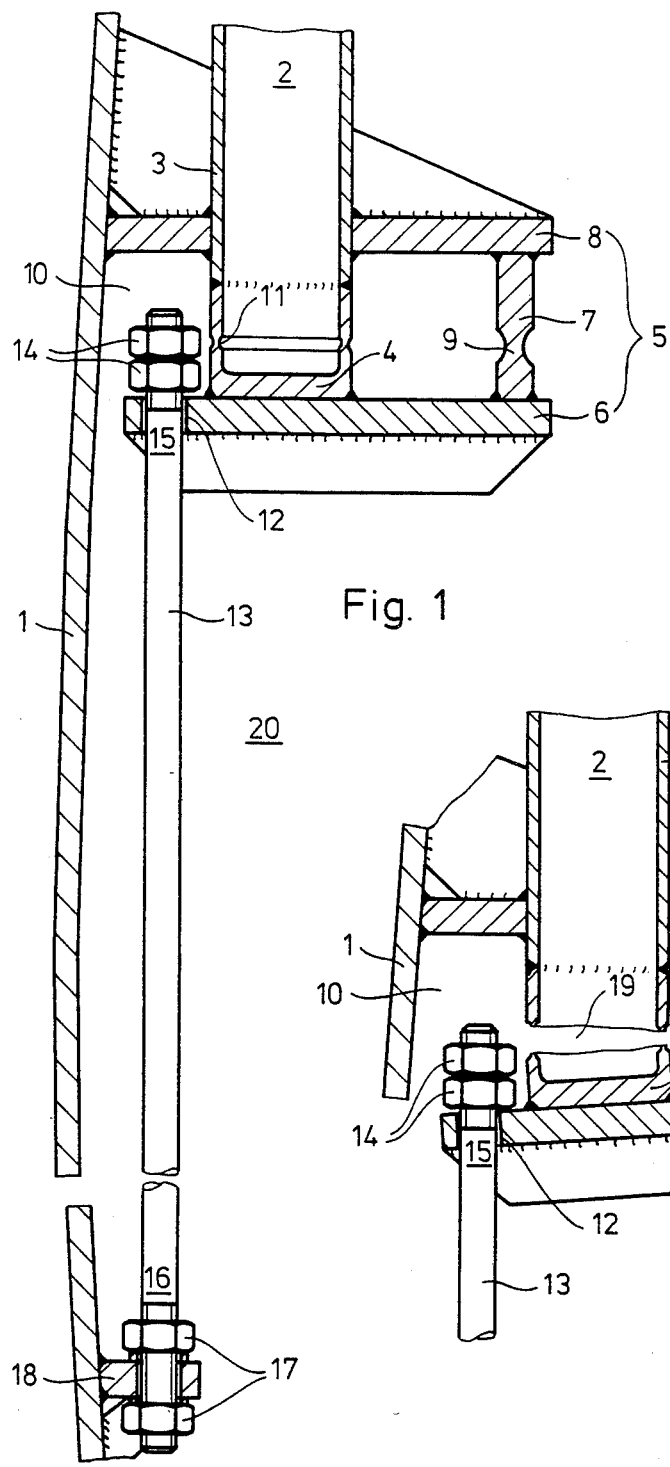

FIG. 1 shows a small portion of the wall 1 of the safety containment of a pressurized water nuclear reactor. The wall 1, that is, the safety containment, has a spherical shape and consists of construction steel of medium quality. A pressure release pipe 2 extends through the containment wall 1 into the interior 20 of the containment and has an inner end 3 in an area where its axis is disposed about parallel to the wall 1. A closure plate 4, with which the pipe 2 is closed, extends essentially normal to the wall 1. The closure plate 4 is welded to a girder beam 6 of a U-shaped mounting structure 5 having a sturdy reinforced bracket section 8 welded to the inside of the containment wall 1 so as to extend normal therefrom and an intermediate section 7 provided with a flex joint area 9, the intermediate section 7 of the U-shaped structure 5 being remote from the wall 1 so that the open area 10 of the U-shaped structure is adjacent the wall 1.

From its inner ends with which the pipe 2 is welded to the girder beam 6, the pipe extends through the bracket section 8 to which it is also welded. In the area of the pipe 2, which is disposed between the girder beam 6 and the bracket section 8, the pipe is provided with at least one circumferential groove 11 providing a reduced thickness wall area so as to form a breaking point, adapted to rupture when the girder beam 6 is pulled away from the bracket section 8 as it is shown in FIG. 2.

Next to the welded closure plate 4 the girder beam 6 has an opening 12 through which one threaded end section 15 of a drawbar 13 extends which is provided with counternuts 14 tightened together with predetermined free motion gap to the girder beam 6. The drawbar 13 extends chord-like with respect to the spherical containment walls and has its other end section 16 mounted to a wall bracket 18 to which it is fastened by nuts 17, the wall bracket 18 being welded to the containment wall 1.

OPERATION OF THE VALVE

During an increase of pressure in the safety containment beyond its predetermined design limits, the containment wall 1 begins to stretch and grow. The drawbar free motion length is so selected that containment wall growth within elastic or even within slight plastic deformation is permitted without opening of the valve but that, at about 0.5% containment wall stretch, the pipe is ruptured at the design breaking point 11 by lever action of the girder beam 6 engaged by the drawbar 13. At 2% containment wall growth the pipe walls are separated at the breaking point to such a degree that, with a pipe diameter 20 of 20 cm, an annular gap 19 with a release flow cross-section of about 200 cm$^2$ is formed.

The play at the end of the drawbar may be set as desired by adjustment of the counternuts 14. Accordingly, the point of valve opening may be adjusted in either direction as desired. With regard to their geometry and materials, the drawbar and wall breaking point area are so dimensioned and designed that the pipe ruptures at the breaking point, preferably after a containment wall growth of at least 0.5% whereas the drawbar 13 remains in an elastic stress range. cl LIST OF REFERENCE NUMERALS 1 Containment wall
2 Release pipe
3 Inner end
4 Closure plate
5 Mounting structure
6 Girder beam
7 Intermediate section
8 Bracket section
9 Flex joint area
10 Open area
11 Breaking point
12 Opening
13 Drawbar
14 Counternut
15 One drawbar and section
16 Other drawbar and section
17 Nut
18 Wall bracket
19 Annular gap
20 Containment interior

I claim:

1. In a containment for a nuclear reactor, a pressure release arrangement comprising: a break structure adapted to provide a pressure relief opening in the containment wall upon occurrence of a predetermined overpressurization, said break structure having a design break area of limited size with an operating bar mechanically connected with the break structure between spaced sections of the containment wall so as to cause rupture of said break structure upon stretching within the plastic deformation range of said containment walls by overpressurization of the containment.

2. A pressure release arrangement for a nuclear reactor pressure container, comprising: a pressure release pipe extending through the container wall and having an inner end provided with a closure plate disposed essentially normal to the wall of said container and arranged adjacent thereto, said pipe having a circumferential groove providing for a reduced thickness pipe area forming a design breaking point, and a drawbar having one end operatively connected to the end of said pipe at said closure plate and the other end to a distant point of the container wall, said drawbar being mounted with a free motion length sufficient only to permit stretching of the container wall by not more than about 0.5% and to cause rupture of the pipe at said breaking point by said drawbar upon further stretching of the container walls while they remain within the plastic deformation range.

3. A pressure release arrangement according to claim 2, wherein a U-shaped mounting structure with legs of unequal length is provided with the longer of said legs having its free end welded to the container wall and said pressure release pipe extends through said longer leg and is welded thereto whereas the pipe closure plate is welded to said shorter leg and the pipe design breaking point is disposed between the legs of said mounting structure, said drawbar having its one end connected to the free end of the shorter leg of said U-shaped mounting structure.

4. A pressure release arrangement according to claim 3, wherein the U bent area of said mounting structure includes a flex joint area of reduced thickness.

5. A pressure release arrangement according to claim 2, wherein the other end of said drawbar is mounted on a wall bracket adapted to move together with the container wall.

6. A pressure release arrangement according to claim 5, wherein said container is spherical, said pipe's inner end is disposed adjacent the container wall and said drawbar forms, with respect to the spherical container walls, essentially a chord between said wall bracket and the inner end of said pressure release pipe.

* * * * *